United States Patent
Palma et al.

[11] Patent Number: 6,084,401
[45] Date of Patent: Jul. 4, 2000

[54] ROTATIONAL POSITION SENSOR EMPLOYING MAGNETO RESISTORS

[75] Inventors: Rodolfo Palma, Canton; David Lee Striker, Plymouth, both of Mich.

[73] Assignee: Ford Globa Technologies, Inc.

[21] Appl. No.: 09/054,000

[22] Filed: Apr. 2, 1998

[51] Int. Cl.[7] ............... G01B 7/30; G01D 5/16; G01R 33/09
[52] U.S. Cl. ............... 324/207.21; 324/207.25; 324/252
[58] Field of Search ............... 324/173, 174, 324/207.12, 207.2–207.26, 252; 341/15

[56] References Cited

U.S. PATENT DOCUMENTS

| | | | |
|---|---|---|---|
| 4,490,674 | 12/1984 | Ito | 324/207.21 X |
| 5,055,781 | 10/1991 | Sakaibara et al. | |
| 5,148,106 | 9/1992 | Ozawa | |
| 5,243,279 | 9/1993 | Bajat e tla. | |
| 5,341,097 | 8/1994 | Wu | |
| 5,568,048 | 10/1996 | Schroeder et al. | |
| 5,570,016 | 10/1996 | Schroeder et al. | |
| 5,589,769 | 12/1996 | Krahn | 324/207.26 |
| 5,600,238 | 2/1997 | Holloway et al. | |
| 5,929,631 | 7/1999 | Striker et al. | 324/207.24 X |

FOREIGN PATENT DOCUMENTS

| | | | |
|---|---|---|---|
| 0 595 553 | 5/1994 | European Pat. Off. | |
| 0 522 807 | 9/1983 | France | |
| 3-78681 | 4/1991 | Japan | 324/207.21 |

Primary Examiner—Gerard Strecker
Attorney, Agent, or Firm—Ford Global Technologies, Inc.

[57] ABSTRACT

A rotational position sensor assembly (10) includes a wheel (20) having a ferromagnetic hub portion (22) and a resistor support member (24) on which an array of magneto resistor elements (28) are mounted. Surrounding the wheel (20) and rotatable relative to it is a magnetic return element (12) on which are mounted permanent magnets (18). The magnetic field created is tangential to the particular MR element(s) (28) aligned with this field, causing a change in resistance that indicates the relative rotational position of the magnetic return element (12) relative to the wheel (20).

20 Claims, 1 Drawing Sheet

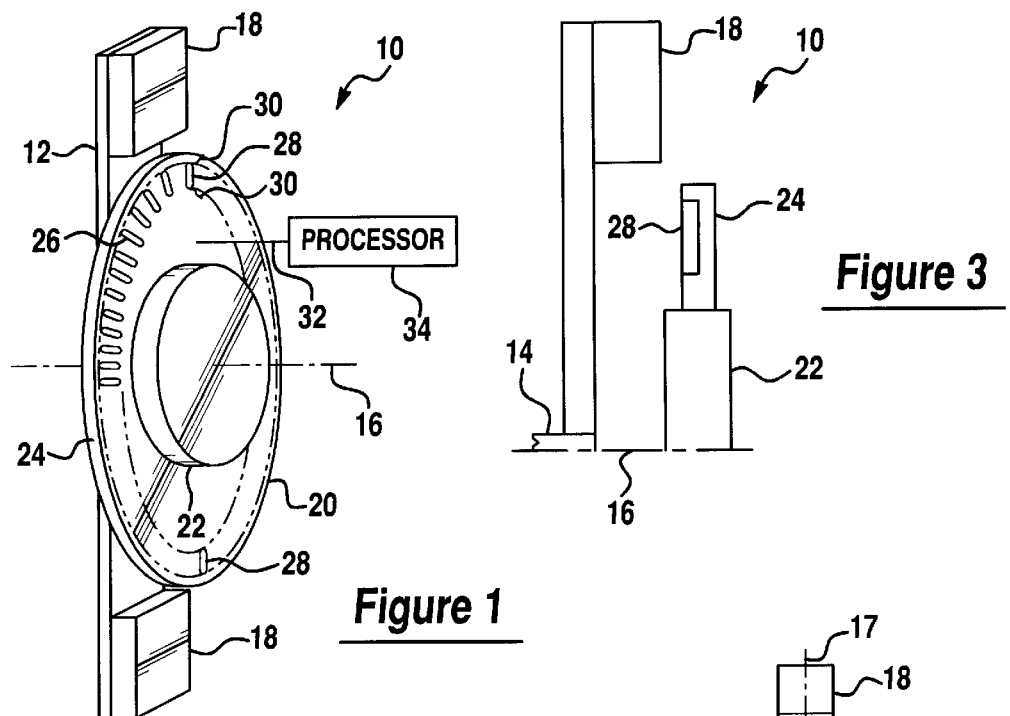
*Figure 3*
*Figure 1*
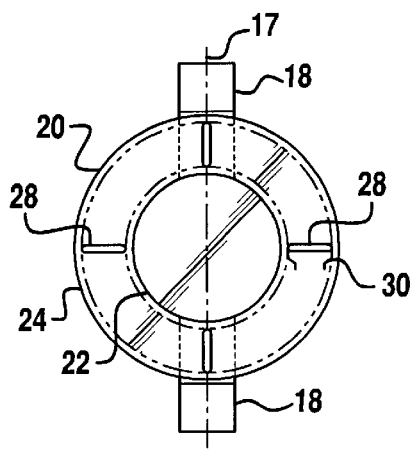
*Figure 2*
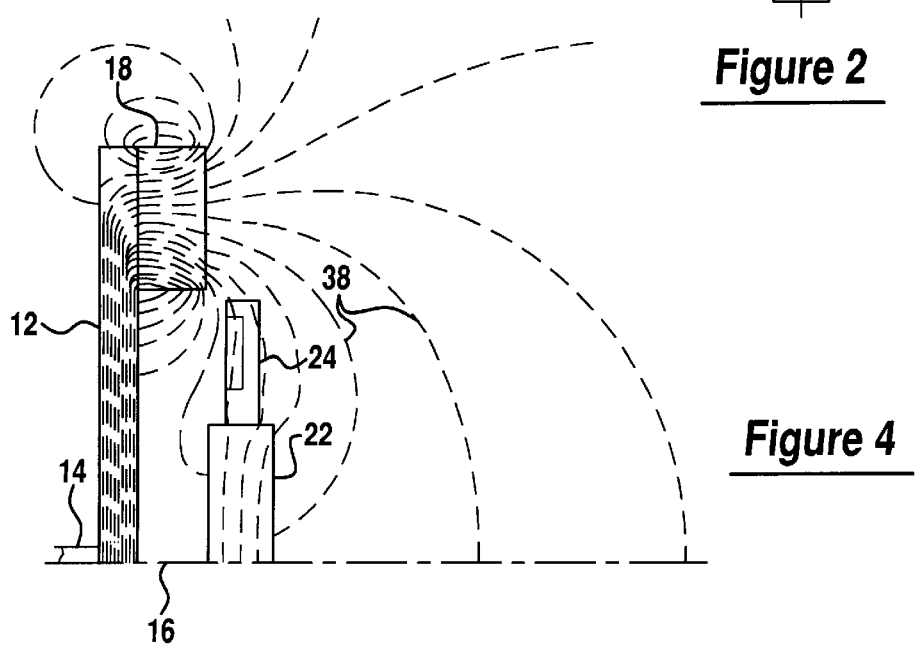
*Figure 4*

ROTATIONAL POSITION SENSOR EMPLOYING MAGNETO RESISTORS

FIELD OF THE INVENTION

The present invention relates to position sensing and more particularly to a position sensor employing magneto resistors.

BACKGROUND OF THE INVENTION

Various methods for rotary position sensing are known, for example, capacitive and inductive position sensors are known. But many of the sensors employed are contact sensors in which the mechanical movement of one member relative to another is traced by mechanical displacement of electrical conductors in order to electrically represent the change in position. Such sensors are subject to mechanical wear that can substantially affect the efficiency and longevity of the electrical conductors and other moving components. Moreover, inherent electrical noise in the output signal can limit the resolution to a relatively large increment of angular displacement.

An alternative form of sensors are generally referred to as non-contact sensors, but such sensors are not always adaptable for certain types of rotary position sensing. For example, conventional capacitive non-contact sensors often rely on changes in the absolute capacitance between two electrodes to generate the control signal. But the absolute value of capacitance can be affected by environmental conditions such as the variations in temperature, moisture, debris, vibration and other factors to which a sensor might be subjected. Other types of non-contact sensors such as Hall Effect transducers increase the cost or complexity of the sensing assembly and signal processing. Thus, position sensors needed for precise position detecting applications typically either require a costly assembly of components or a great deal of calibration to obtain the accuracy required.

Furthermore, many sensors can, over time, lose accuracy due to play of components or are temperature sensitive, thus losing the precision required for the particular application.

Another example of non-contact sensors are magnetic sensors. But these sensors can also end up being expensive to construct and assure that the precision of the magnetic sensing is not affected by its surroundings. Moreover, these types of sensor assemblies may affect other adjacent sensors or components due to the magnetic field produced by this particular magnetic sensor assembly.

Thus, it is desirable for particular high precision positional sensing needs to employ a non-contact sensor assembly that will maintain its accuracy over time for various temperature conditions and will not interfere with or be interfered with by components that may be adjacent to the sensor. Also, preferably, this sensor will accomplish these objectives with minimal cost needed to produce and operate the sensor.

SUMMARY OF THE INVENTION

In its embodiments, the present invention contemplates a position sensor. The position sensor includes a wheel, being generally disk shaped and having a first diameter about an axis, the wheel including a ferromagnetic hub portion, being generally disk shaped and having a second diameter generally concentric with and smaller than the first diameter. An outer support portion extends radially about the hub portion, with the support portion including a plurality of magneto resistive elements mounted thereon. The position sensor also includes a magnetic member, rotationally mounted relative to the wheel about the axis, including a magnetic return element extending a greater distance from the axis than the wheel, and a first permanent magnet mounted to the magnetic return around a portion of the periphery of the wheel in proximity to at least one of the plurality of magnetic resistive elements.

Accordingly, an object of the present invention is to provide a high precision, non-contact, magnetic sensor assembly that will maintain its accuracy over time.

An advantage of the present invention is that the sensor accuracy is not affected by temperature changes.

Another advantage of the present invention is that it can operate in proximity to other components without creating magnetic interference and by maintaining its precision when interference from other components is present.

A further advantage of the present invention is the low cost and ease of assembly of the non-contact sensor assembly.

An additional advantage of the present invention is that no calibration is required.

BRIEF DESCRIPTION OF THE DRAWINGS

FIG. 1 is a perspective view of a portion of the sensor assembly in accordance with the present invention;

FIG. 2 is a front view, on a reduced scale, of the portion of the sensor assembly illustrated in FIG. 1;

FIG. 3 is a side view of a portion of the sensor assembly in accordance with the present invention; and FIG. 4 is a view similar to FIG. 3 illustrating magnetic flux lines for the sensor assembly.

DETAILED DESCRIPTION OF THE PREFERRED EMBODIMENTS

A rotational position sensor assembly 10 is illustrated in FIGS. 1–4. The assembly includes a magnetic return element 12. The return element 12 is preferably made of a soft magnetic material, such as an inexpensive low carbon steel. It is also mounted on a shaft 14, with the shaft 14 able to selectively rotate the return element 12 about a rotation axis 16. The magnetic return element also includes a vertical axis 17, shown in FIG. 2, about which it is symmetrical. This vertical axis 17 is a reference axis that rotates with the return element 12.

Mounted to the ends of the return element is a pair of permanent magnets 18. The magnets 18 are magnetized in the axis 16 direction, which allows for simple to manufacture magnets and for a simple procedure to magnetize them. The permanent magnets 18 can be made from an alnico alloy if enhanced temperature stabilization is desired, or for low cost and convenience, the magnets 18 can be ceramic. While only one pair of permanent magnets is illustrated, one could employ multiple pairs of permanent magnets, each circumferentially spaced from the other pairs.

Mounted rotationally fixed, in any conventional manner of mounting depending upon the particular application, is a support wheel 20. At the center of the support wheel 20 is a disk shaped ferromagnetic hub 22. This material is preferably a soft magnetic material; for example, it can be a low carbon steel. The hub 22 is thicker than and extends beyond both sides of a resistor support member 24, allowing for a magnetic field having a region of relative constant value along the length of the hub 22. The hub configuration enables axial movement of the rotating magnetic assembly relative to the wheel 20 (away from and toward) without loss on the tangential magnetic field component used in the position sensing.

The resistor support member 24 is concentric with the hub 22 and extends radially therefrom. An array 26 of magneto resistive (MR) elements 28 are mounted on the resistor support member 24. They are radially oriented with their plane on the support member 24. For the particular embodiment shown, the MR elements 28 are uniformly distributed about the support member 24 periphery, but other non-uniform distributions are possible, if so desired. Each of the MR elements 28 includes leads 30, (shown for one MR element only), that electrically connect to an output lead wire 32 and to a processor 34, (shown schematically in FIG. 1). Various electronics can be used to process the output from the MR elements 28. An example of such processing is disclosed in U.S. patent application Ser. No. 08/887,061, filed Jul. 2, 1997, U.S. Pat. No. 5,929,631, and incorporated herein by reference.

The operation of the sensor assembly will now be discussed. The sensor assembly 10 produces a magnetic field, illustrated in FIG. 4 by the equipotential lines of magnetic flux 38 along the plane containing the vertical axis 17. From these lines of flux 38 it can be seen that the magnetic field is tangential to the support wheel 20 at the location of an MR element 28 aligned with the vertical axis 17. This produces a tangential magnetic field on that particular MR element 28 within the array 26, and an essentially zero field on the other MR elements 28.

When the magnets 18 and the return element 12 are rotated by the shaft 14, their change in position relative to the wheel 20 moves the magnetic field, which is detected by the MR elements 28 and associated electronics. The particular MR element 28 aligned with one of the permanent magnets 18 (i.e., along the vertical axis) reacts to the presence of the tangential magnetic field by a reduction in its resistance. This reduction, detected by the electronics 34, allows for determination of the position of the vertical axis 17 of the rotational magnetic structure relative to the support wheel 20. Since the determination of the position is based on the relative value of the MR element's 28 resistance and not in the absolute value of resistance, no calibration is required.

Moreover, the return element 12 acts as a magnetic return, as can be seen by the flux lines 38 in FIG. 4. This allows for a reduction in the size (and cost) of the permanent magnets 18 and acts as a magnetic shield to eliminate the leakage of magnetic flux from the back of the sensor assembly 10. By eliminating the leakage, the spread of the field is reduced, thus reducing potential interference with other possible nearby components, while also increasing the effectiveness of the magnetic structure in the region where the MR element(s) 28 of interest are located.

Additionally, the ferromagnetic hub 22 concentrates the magnetic field to a relative and controlled narrow region around the vertical axis 17 of the return element 12. This results in the magnetic field having a region of relative constant value along the length of the hub 22, enabling the axial movement of the rotatable portion relative to the fixed portion of the sensor assembly (toward or away from) without loss on the tangential field component used by the MR elements 28 for the position sensing.

Thus, the position sensor assembly 10 possesses self calibration, reducing the effects of environmental conditions such as temperature, and will operate properly even with axial play, introduced due to wear or other factors. The sensor is also made of low cost components, and is easy to manufacture.

While certain embodiments of the present invention have been described in detail, those familiar with the art to which this invention relates will recognize various alternative designs and embodiments for practicing the invention as defined by the following claims.

We claim:

1. A position sensor comprising:

a wheel, being generally disk shaped and having a first diameter about an axis, the wheel including a ferromagnetic hub portion, being generally disk shaped and having a second diameter generally concentric with and smaller than the first diameter, and an outer support portion extending radially about the hub portion, with the support portion including a plurality of magneto resistive elements mounted thereon; and a magnetic member, rotationally mounted relative to the wheel about the axis, including a magnetic element extending a greater distance from the axis than the wheel, and a first permanent magnet mounted to the magnetic element in relative close proximity to at least one of the plurality of magneto resistive elements.

2. The position sensor of claim 1 further including processing means, operatively engaging the plurality of magneto resistive elements, for determining changes in resistance within each of the magneto resistive elements.

3. The position sensor of claim 2 wherein the plurality of magneto resistive elements are circumferentially equally spaced about the outer diameter of the support portion.

4. The position sensor of claim 3 wherein each of the magneto resistive elements is oriented to extend radially relative to the axis.

5. The position sensor of claim 4 wherein the hub portion has a thickness greater than the support portion and extends axially beyond the support portion on both sides.

6. The position sensor of claim 5 wherein the magnetic element is made of a low carbon steel.

7. The position sensor of claim 6 wherein the first permanent magnet is made of alnico.

8. The position sensor of claim 6 wherein the first permanent magnet is made of ceramic.

9. The position sensor of claim 1 further including a second permanent magnet mounted to the magnetic element and spaced from the first permanent magnet.

10. The position sensor of claim 1 wherein each of the magneto resistive elements is oriented to extend radially relative to the axis.

11. The position sensor of claim 10 wherein the plurality of magneto resistive elements are circumferentially equally spaced about the outer diameter of the support portion.

12. The position sensor of claim 11 further including a second permanent magnet mounted to the magnetic element and spaced from the first permanent magnet.

13. A position sensor comprising:

a wheel, being generally disk shaped and having a first diameter about an axis, the wheel including a ferromagnetic hub portion, being generally disk shaped and having a second diameter generally concentric with and smaller than the first diameter, and an outer support portion extending radially about the hub portion, with the support portion including a plurality of magneto resistive elements mounted thereon oriented to extend radially relative to the axis; and a magnetic member, rotationally mounted relative to the wheel about the axis, including a magnetic element extending a greater distance from the axis than the wheel, and a first permanent magnet mounted to the magnetic element in relative close proximity to at least one of the plurality of magneto resistive elements.

14. The position sensor of claim 13 wherein the plurality of magneto resistive elements are circumferentially equally spaced about the outer diameter of the support portion.

15. The position sensor of claim 14 further including processing means, operatively engaging the plurality of magneto resistive elements, for determining changes in resistance within each of the magneto resistive elements.

16. The position sensor of claim 15 further including a second permanent magnet mounted to the magnetic element and spaced from the first permanent magnet.

17. A position sensor comprising:

a wheel, being generally disk shaped and having a first diameter about an axis, the wheel including a ferromagnetic hub portion, being generally disk shaped and having a second diameter generally concentric with and smaller than the first diameter, and an outer support portion extending radially about the hub portion, with the support portion including a plurality of magneto resistive elements mounted thereon, and with the hub portion having a thickness greater than the support portion and extending axially beyond the support portion on both sides; and a magnetic member, rotationally mounted relative to the wheel about the axis, including a magnetic element extending a greater distance from the axis than the wheel, and a first and a second permanent magnet which are each mounted to the magnetic element in relative close proximity to at least one of the plurality of magneto resistive elements, with the second permanent magnet mounted to the magnetic element spaced from the first permanent magnet, diametrically opposed from the first magnet about the axis.

18. The position sensor of claim 17 wherein the plurality of magneto resistive elements are circumferentially equally spaced about the outer diameter of the support portion, and each of the magneto resistive elements is oriented to extend radially relative to the axis.

19. The position sensor of claim 17 further including processing means, operatively engaging the plurality of magneto resistive elements, for determining changes in resistance within each of the magneto resistive elements.

20. The position sensor of claim 17 wherein the hub portion has a thickness greater than the support portion and extends axially beyond the support portion on both sides.

* * * * *

UNITED STATES PATENT AND TRADEMARK OFFICE
CERTIFICATE OF CORRECTION

| | |
|---|---|
| PATENT NO. | : 6,084,401 |
| APPLICATION NO. | : 09/054000 |
| DATED | : July 4, 2000 |
| INVENTOR(S) | : Palma et al. |

It is certified that error appears in the above-identified patent and that said Letters Patent is hereby corrected as shown below:

Page 1, the Assignee should read --Visteon Global Technologies, Inc.--

Signed and Sealed this

Twenty-second Day of May, 2007

JON W. DUDAS
*Director of the United States Patent and Trademark Office*